United States Patent
Davidson et al.

(10) Patent No.: US 9,442,481 B2
(45) Date of Patent: Sep. 13, 2016

(54) AUTOMATIC WELD ARC MONITORING SYSTEM

(75) Inventors: Robert Raimund Davidson, New London, WI (US); Joseph Kyle Flnk, Black Creek, WI (US); Paul Warren Cleveland, Menasha, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 1455 days.

(21) Appl. No.: 12/350,301

(22) Filed: Jan. 8, 2009

(65) Prior Publication Data

US 2009/0173726 A1 Jul. 9, 2009

Related U.S. Application Data

(60) Provisional application No. 61/019,972, filed on Jan. 9, 2008.

(51) Int. Cl.
*B23K 9/10* (2006.01)
*G05B 19/4093* (2006.01)
*B23K 9/095* (2006.01)
*G05B 19/414* (2006.01)

(52) U.S. Cl.
CPC ....... *G05B 19/40937* (2013.01); *B23K 9/0956* (2013.01); *G05B 19/414* (2013.01); *G05B 2219/37217* (2013.01); *G05B 2219/50206* (2013.01); *Y02P 90/265* (2015.11)

(58) Field of Classification Search
CPC ........... B23K 9/10; B23K 9/08; B23K 9/095
USPC ........ 219/130.1, 130.01, 130.5, 130.4, 137.7
See application file for complete search history.

(56) References Cited

U.S. PATENT DOCUMENTS

| | | | |
|---|---|---|---|
| 4,721,947 A | | 1/1988 | Brown |
| 4,975,558 A | * | 12/1990 | Lukens ..................... B23K 9/08 219/123 |
| 5,233,158 A | * | 8/1993 | Karakama ............ B23K 9/0956 219/130.33 |
| 5,278,390 A | * | 1/1994 | Blankenship .............. 219/130.5 |
| 5,708,253 A | | 1/1998 | Bloch et al. |
| 6,479,793 B1 | * | 11/2002 | Wittmann et al. .......... 219/130.5 |

(Continued)

FOREIGN PATENT DOCUMENTS

| | | |
|---|---|---|
| EP | 1262847 A | 12/2002 |
| EP | 1683599 A | 7/2006 |

(Continued)

*Primary Examiner* — Dana Ross
*Assistant Examiner* — Ayub Maye
(74) *Attorney, Agent, or Firm* — Quarles & Brady LLP

(57) ABSTRACT

A welding system including an arc monitoring, training, and control system is disclosed. The welding system includes a power supply, controller, and associated memory. When a weld is performed, the weld command and weld feedback parameters can be stored in the memory, along with associated alarm limit values. During subsequent welds, the input weld commands and actual feedback values can be compared to the established limits, and a fault signal provided to an operator or supervisor when the value exceeds the established limits. The fault signals can be used for training operators, as well as providing monitoring signals, and can be stored with weld data in a database for later analysis. In addition, collected weld data can be used to determine when to clean, repair, or replace consumables, including, for example, contact tips, wire drive liners, and drive rolls, and to monitor usage of wire and gas.

22 Claims, 13 Drawing Sheets

(56) References Cited

U.S. PATENT DOCUMENTS

| | | |
|---|---|---|
| 6,583,386 B1 | 6/2003 | Ivkovich |
| 7,186,949 B2 | 3/2007 | Nishikawa et al. |
| 7,227,099 B2 * | 6/2007 | Blot et al. ............... 219/130.01 |
| 7,268,318 B2 | 9/2007 | Ikeda et al. |
| 2004/0020907 A1 * | 2/2004 | Zauner et al. ........... 219/130.21 |
| 2008/0078811 A1 * | 4/2008 | Hillen et al. ................. 228/101 |
| 2008/0083705 A1 * | 4/2008 | Peters .............................. 219/61 |

FOREIGN PATENT DOCUMENTS

| | | |
|---|---|---|
| WO | 0102125 A | 1/2001 |
| WO | 2007130255 A | 11/2007 |

* cited by examiner

```
                    Weld Program Set-Up                    34

Weld Program           1

Internal Commands      On
        Wirefeed               500
        Volts                  26.0
        Inductance             60
        Set Limits Arc Delay Time         1.5
```

FIG. 3

Part Set-Up — 52

| | |
|---|---|
| Part Name | 155 |
| Weld 1 | Program 1 |
| Weld 2 | Program 3 |
| Weld 3 | Program 7 |
| Weld 4 | Program 8 |
| Weld Count | 4 |
| Arc Start Time | 1.5 |

Save Part — 54

FIG. 6

Weld Monitor Configuration

| | | |
|---|---|---|
| Operator | Smith | |
| Part/Program | 155 | |
| Programmed Commands | Off | |
| Arc Monitor | On | |
| Weld Counter | On | |
| Restore Commands | Activate | |
| Weld Time | On | 10 Sec. |
| | | |
| Limits/Fault Signals | | |
| Limit – Voltage Command | +/- 3% | On |
| Limit - WFS Command | +/- 2% | On |
| Limit – Inductance Command | +/- 2% | Off |
| Limit – Actual Voltage | +/- 3% | On |
| Limit – Actual Current | +/- 1% | On |
| Limit - Actual WFS | +/- 3% | On |
| Limit – Weld Time | +/- 2% | Off |
| Fault Signal Type | Visual | |

Save Configuration

FIG. 7

Weld Data / Part 155

| | |
|---|---|
| Weld | 2 |
| Time Stamp | 12/1/07 |
| | 2:44:00 |
| | |
| Average Actual Wirefeed Speed | 500 |
| Average Actual Volts | 26.1 |
| Average Actual Amps | 300 |
| Weld Time | 30.0 |
| Travel Speed | 5 in/minute |

Consumable Usage
    Wire
    Gas

Faults
    Over Voltage          26.4V 2:44:15

Weld Data

| Weld | Operator | Date | Time Stamp |
|---|---|---|---|
| Part 155 | Smith | 12/1/07 | 2:44:00 |
| Part 155 | Smith | 12/1/07 | 2:55:33 |
| Part 159 | Smith | 12/1/07 | 3:01:15 |
| Part 155 | Smith | 12/1/07 | 3:11:00 |
| Part 159 | Smith | 12/1/07 | 3:12:32 |
| Part 157 | Jones | 12/1/07 | 3:13:12 |
| Part 155 | Jones | 12/1/07 | 3:21:11 |

View Weld Detail

FIG. 12

Weld Detail

| | | | |
|---|---|---|---|
| Part: | 155 | | |
| Operator: | Smith | | |
| Time: | 12/1/07 2:44:00 | | |
| Faults: | 2:44:15 | Over Voltage | 26.3 |
| | 2:44:32 | Over Weld Time | 31.5 |
| Weld Count: | 4 | | |

Weld Segments:

| | Command | Actual | Ave/ |
|---|---|---|---|
| | | | 1000 |
| Weld 1: | | | |
| Volts | 27.0 | 27.0 | 27.2 |
| WFS | 350 | 348 | 351 |
| Inductance | 60 | 58 | 61 |
| Amps | | 480 | 495 |
| | | | |
| Weld 2: | | | |
| Volts | 26.0 | 26.2 | 25.8 |
| WFS | 300 | 302 | 301 |
| Inductance | 60 | 58 | 61 |
| Amps | | 480 | 501 |
| | | | |
| Weld 3: | | | |
| Volts | 25.5 | 26.2 | 25.8 |
| WFS | 280 | 278 | 281 |
| Inductance | 50 | 52 | 53 |
| Amps | | 499 | 497 |
| | | | |
| Weld 4: | | | |
| Volts | 28.0 | 28.1 | 28.3 |
| WFS | 375 | 377 | 376 |
| Inductance | 60 | 58 | 61 |
| Amps | | 550 | 552 |

[Return]

FIG. 13

AUTOMATIC WELD ARC MONITORING SYSTEM

CROSS-REFERENCE TO RELATED APPLICATIONS

This application claims the benefit of U.S. provisional application 61/019,972 filed Jan. 9, 2008, which is hereby incorporated by reference in its entirety.

FIELD OF THE INVENTION

The present invention is directed to a method and apparatus for monitoring arc data in welding systems, and more specifically to a welding system including an internal arc monitoring system for monitoring weld data, training operators, and communicating resultant weld data to internal databases and external devices.

BACKGROUND OF THE INVENTION

As the level of automation has increased in mass production facilities, and the speed of welding operations has increased, it has become increasingly important for management personnel to monitor and control welding parameters and processes to assure consistent and proper joining of materials, and to ensure that completed welds fall within predetermined quality parameters.

To provide a high level of consistency in welds, semi-automatic, automatic, and robotic welding processes therefore typically include welding programs or procedures that are preprogrammed for specific operations. These programs, in theory, should provide consistent and repeatable welds, irrespective of the experience level of the user. Experience has shown, however, that even in highly automated applications, welding parameters can and do vary after long periods of use, and in different environmental conditions. These variations can be caused by a number of factors, including, for example, variations in the parts to be welded, variations in motor and wire feed speed control over periods of use, variations in gas flow over time, and variations in the distance between a welding tip and the workpiece.

Increasingly, moreover, welding personnel on the factory floor are relatively inexperienced and insufficiently trained to properly identify and correct for these problems. In addition to providing predetermined welding procedures, therefore, it is also important for management personnel to monitor weld and operator performance. Monitoring of the weld allows management personnel to analyze the welding process, identify problems, and make corrections before significant down time or waste of material occurs.

To meet these needs, arc monitoring devices have been developed. These devices are typically stand-alone units, connected external to the welding power supply, and which include sensors for monitoring welding parameters, such as current, voltage, and wire feed speed. These devices typically provide a visual or audible signal when a welding feedback parameter is outside of a predetermined range, providing a signal to the operator or his or her supervisor that a fault has occurred. Monitoring and alarm data can be used to train personnel by providing an alarm signal when a weld has veered outside of accepted parameters. This data can also be used to make corrections during the welding process, and can be stored for analysis.

While providing a valuable function, these devices, however, add significantly to the complexity and expense of a welding cell installation, require additional external wiring for the sensors, and increase the overall size or footprint of the cell itself. Furthermore, because these devices require external sensors, often times, they do not provide sufficiently accurate readings of actual weld parameters, and they cannot provide all of the data necessary for properly monitoring a weld.

Additionally, because these devices are external to the welding system itself, they cannot monitor wire feed motor power or other parameters that are useful in analyzing both equipment failure and failures or deterioration of consumables, such as contact tips, or in other components such as wire feed liners and drive rolls. Furthermore, these devices cannot be used to monitor or to adjust the welding commands during a welding process, and therefore are not optimized for training purposes, or for teaching operators to correct for problems encountered during a weld, and cannot correct for poor selection of welding commands. The present invention addresses these problems.

SUMMARY OF THE INVENTION

In one aspect of the invention, a welding system is provided. The welding system comprises a power supply for providing welding power, a wire feed system for providing wire to a weld, and a weld parameter feedback sensor for monitoring at least one of a current feedback, a voltage feedback signal, and a wire feed speed feedback signal. A controller is programmed to receive a welding command for driving the power supply and the wire feed system, to monitor the welding command and the weld parameter feedback sensor, and to selectively store the welding command and the monitored feedback as a programmed weld when an operator selectively saves the selected weld parameters.

In another aspect of the invention, the welding system includes a programmed weld that is accessible to a user to provide the weld command signal to control the power supply and the wire feed system. The controller can be further programmed to include a limit corresponding to the weld command signal, and to provide a fault signal when the selected limit is exceeded.

The controller can also be programmed to monitor the weld command parameters and weld feedback parameters during a weld, to selectively store the weld command parameters and feedback parameters for a weld of an acceptable quality, and to calculate the limits as a function of the stored weld command parameters and feedback parameters.

In yet another aspect of the invention, the processor is further programmed to store a sequence of programmed welds as a programmed part, and to provide access to a user to selectively retrieve the programmed part and to provide a command to weld the part. The processor can be further programmed to associate a user with a selected limit. The processor can further be programmed to associate an operator-supplied time with a weld to be performed, and to allow an operator to designate a plurality of sequential welds to designate a programmed part.

In another aspect of the invention, a method for monitoring a quality level of a weld procedure is provided. The method comprises performing a weld of an acceptable quality and storing a weld command parameter and a weld feedback parameter corresponding to the weld, and associating a fault limit with at least one of the weld command parameter and the weld feedback parameter, and monitoring a corresponding weld command parameter and a corresponding weld feedback parameter during a subsequent weld, and comparing the corresponding weld command parameter and the corresponding weld feedback parameter to the fault limits during the weld. A fault alarm signal is provided when the weld command parameter exceeds the fault limit. The weld command parameter can comprise at least one of a voltage command, a wire feed speed command, and an inductance command, and the weld feedback parameter comprises at least one of a voltage feedback, a current feedback, a wire feed speed feedback, and a weld time feedback.

In still another aspect of the invention, the method can comprise the step of associating a user with the limits. A second weld of an acceptable quality can also be stored, along with a weld command parameter and a weld feedback parameter corresponding to the second weld. The weld command and the second weld command can be stored as sequential welds in a programmed part.

In another aspect of the invention, the method comprises the step of receiving a user-selected weld time, and the step of monitoring a corresponding weld command parameter and a corresponding weld feedback parameter during a subsequent weld further comprises monitoring the user-selected weld time, and ending the subsequent weld when the weld time is exceeded.

In yet another aspect of the invention, a method for monitoring a quality level of a weld procedure is provided. The method comprises performing a weld, determining whether the weld is of an acceptable quality, storing a weld command parameter and a weld feedback parameter corresponding to the weld as a weld program when the weld is of an acceptable quality, and accessing the weld program to provide a weld command parameter for a subsequent weld.

The method can also comprise the steps of performing a second weld, determining whether the second weld is of an acceptable quality, storing a weld command parameter and a weld feedback parameter corresponding to the second weld as a second weld program when the weld is of an acceptable quality, selectively linking the weld program and the second weld program as a part program, and accessing the part program to provide a weld command parameter for a subsequent weld comprising the weld program and the second weld program.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 3 is a screen shot illustrating a weld program set-up screen for use in the welding system of FIG. 1;

FIG. 6 is a screen shot illustrating a part set-up function for use in the welding system of FIG. 1;

FIG. 7 is a screen shot of a weld monitor configuration screen for use in the welding system of FIG. 1;

FIG. 11 is a screen shot illustrating a display of weld data after a weld;

FIG. 12 is a screen shot illustrating a database of weld data;

FIG. 13 is a screen shot illustrating weld details of a selected weld from the weld data screen of FIG. 12.

DETAILED DESCRIPTION OF THE INVENTION

Figure 1:
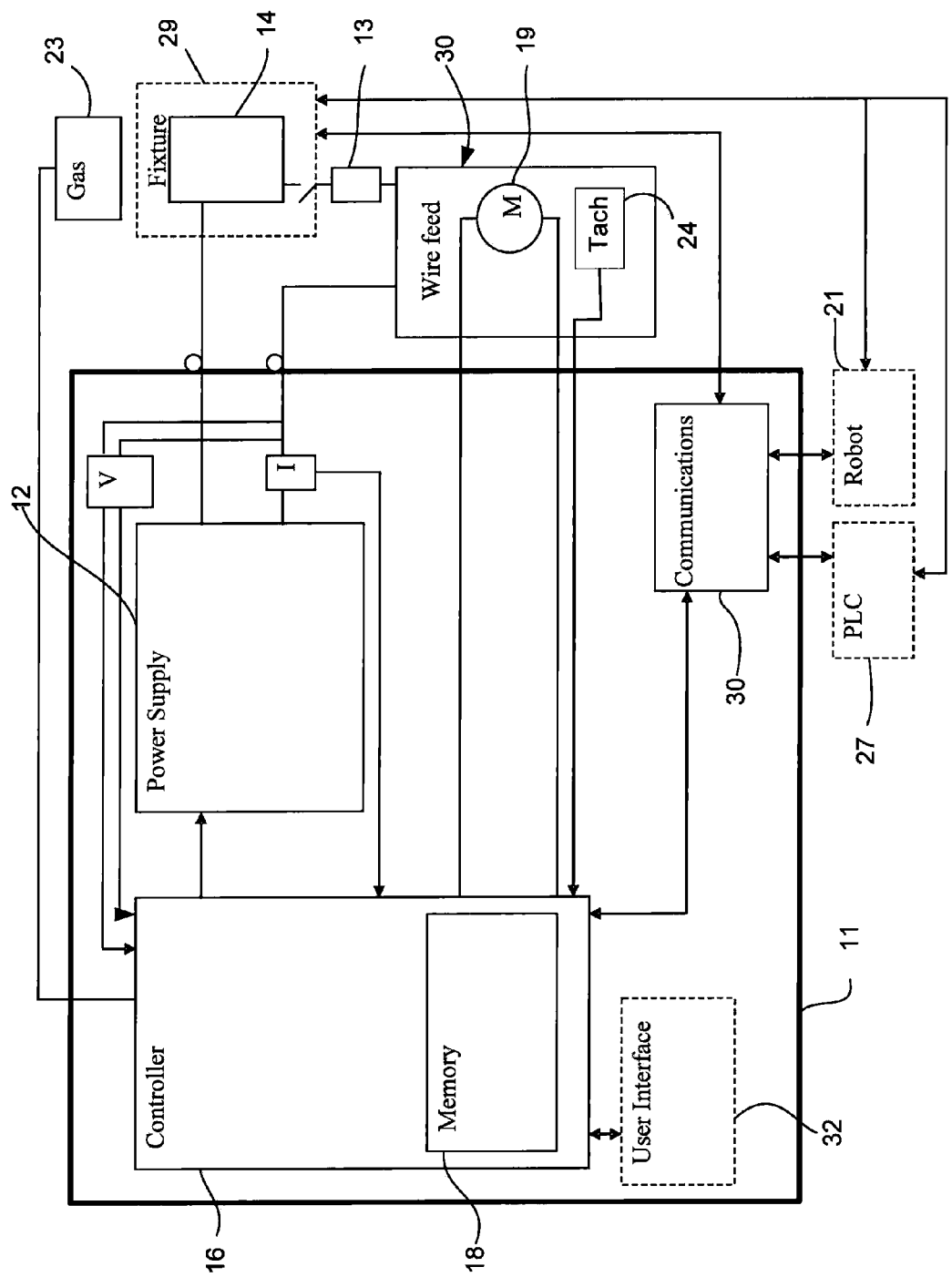
FIG. 1 is a block diagram of a welding system capable of use in the present invention.

Referring now to the Figures and more particularly to FIG. 1, an exemplary welding system 10 is shown. The welding system 10 includes a housing 11 containing a power supply 12, a controller 16, and a communications system 30. The controller 16 can include one or more microcontroller, microprocessor, digital signal processor, or other programmable controller, along with an internal or external memory component 18, capable of storing welding programs and procedures specified by the user. Bidirectional communications between the controller 16 and external devices are provided through the communications system 30, preferably through a serial communications link such as DeviceNet, Profibus, RS-232 or other communications systems, or through a network communications device such as an Ethernet connection or other wired or wireless communication devices. The controller 16 may also be connected to a user interface 32, which can be mounted in the housing 11, or provided external to the housing 11 and welding system 10, and can include a user display and input devices, such as keys, switches, joysticks, analog or digital potentiometers, or other devices to provide information to and receive information from an operator or user of the welding system 10. Alternatively, or in addition to the communications devices discussed above, individual analog and digital inputs and outputs could be directly connected to the controller 16 either in conjunction with, in place of, or as part of the communications systems 30 discussed above. The power supply 12 can be a constant voltage power supply or a constant voltage/constant current power supply, and preferably includes pulsing capabilities.

Referring still to FIG. 1, the controller 16 is further connected to external welding components including a wire feed system 20, and a gas valve 23. The wire feed system 20 includes a motor 19 that drives wire through drive rolls and a liner to a torch or gun 13 including a contact tip. The gas valve 23 can be either an on/off valve, a metered valve controlled by controller 16, or can include a separate or integral flow meter.

Optionally, the welding system 10 can be provided in a welding cell, which can include, for example, flexible or hard automation components, such as a welding robot 21, a programmable logic controller (PLC) 27, and fixtures 29. The fixtures 29 can include devices such as clamps for maintaining a workpiece 14 in position during a weld, and preferably also include sensing devices, such as devices for providing a signal to the controller 16 when associated clamps either open or close, and proximity sensors for sensing a position of the workpiece 14 in the fixture 29 or a position of a welding torch approaching the workpiece 14. Additionally, a series of light emitting diodes, laser diodes, or other lighting elements can be provided in the fixture either to illuminate an area to be welded for the operator, or to provide an indicator to the operator. The indicator can, for example, indicate which in a series of welds is to be performed, providing a sequence for the operator. Lighting and other visual aids can also be used to indicate when a welded part is complete. Audio-producing devices, such as buzzers and horns, can also be associated with the fixture to provide a signal to an operator or supervisor when a weld is complete, when an error has occurred, or in various other situations. These devices can be connected directly through the communications system 30, or through an external device such as the PLC 27, robot 21, a computer system, or other controller.

The welding system 10 can be used in various modes of operation, including both semi-automatic and automatic modes of operation. Weld command parameters can be stored as pre-programmed weld procedures in memory 18, as discussed more thoroughly below, or provided to the weld system 10 during a weld through communications system 30. In a semi-automatic mode, for example, an operator provides a trigger signal to the controller 16 from a hand held wire feed gun or torch, and can either use pre-programmed command levels, or by varying voltage and wire feed speed values during the weld. In the automatic mode, an external device, such as a robot controller associated with robot 21 or the PLC 27 provides a signal to the controller of the welding system 10 to start the weld. Again, weld parameter commands can be retrieved from memory 18, or be provided from the robot 21, PLC 27, or another external device through communications system 30.

In operation, the controller 16 receives a trigger signal as described above and commands the power supply 12 to provide welding current and voltage to start an arc at the workpiece 14. Command levels for controlling the weld can be set and stored internally in memory 18, or can be received from the external components, such as robot 21 and PLC 27, or other controllers or computers as discussed above, either in the form of analog or digital control signals. Based on the commands, the controller 16 also commands the wire feed system 20 to drive filler metal from the motor 19 to a contact tip in torch 13, providing wire to the weld at the workpiece 14. The controller 16 also controls the gas valve 23 to selectively provide shielding gas to the weld. Depending on the type of gas valve used, the controller 16 can provide a simple on/off signal, or control the level of flow from the valve 23.

During operation, the controller 16 receives feedback from a voltage sensor 26, a current sensor 28, and a wire feed speed sensor or tachometer 24, and can also optionally monitor gas flow through a gas flow sensor associated with the gas valve 23. The feedback data is used by the controller 16 to control the power supply 12, wire feed system 20, and gas valve 23. The feedback and command data, moreover, can be used in a set-up mode to determine weld parameter values for a known good weld, which can then be stored as a weld program in the memory 18, as described below. The weld parameters determined during set-up can be further used to monitor the arc during a weld and to provide weld data to supervisory or other personnel through the communications system 30, and selectively to provide visual or audio signals to a supervisor or operator when fault conditions are encountered.

Figure 2:
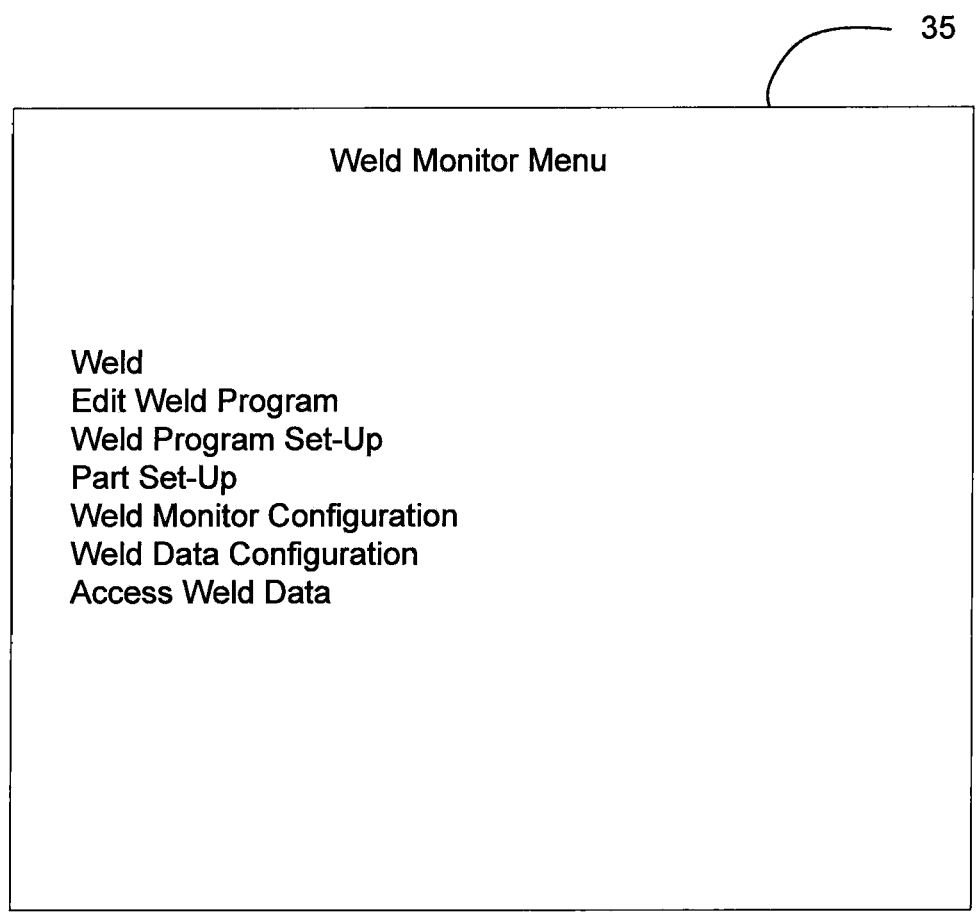
FIG. 2 is screen shot illustrating a main screen for selecting options in the welding system of FIG. 1.
Figure 5:
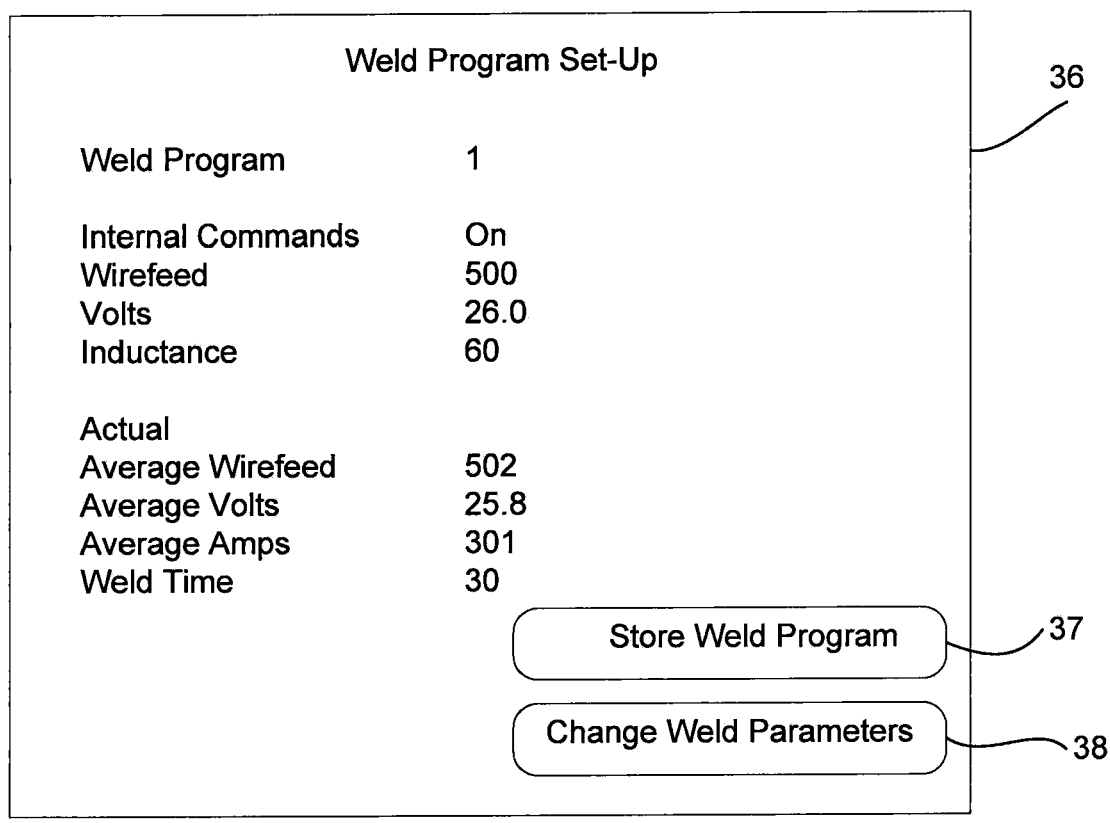
FIG. 5 is a screen shot illustrating a post-weld set-up screen providing an option of storing a weld.
Figure 8:
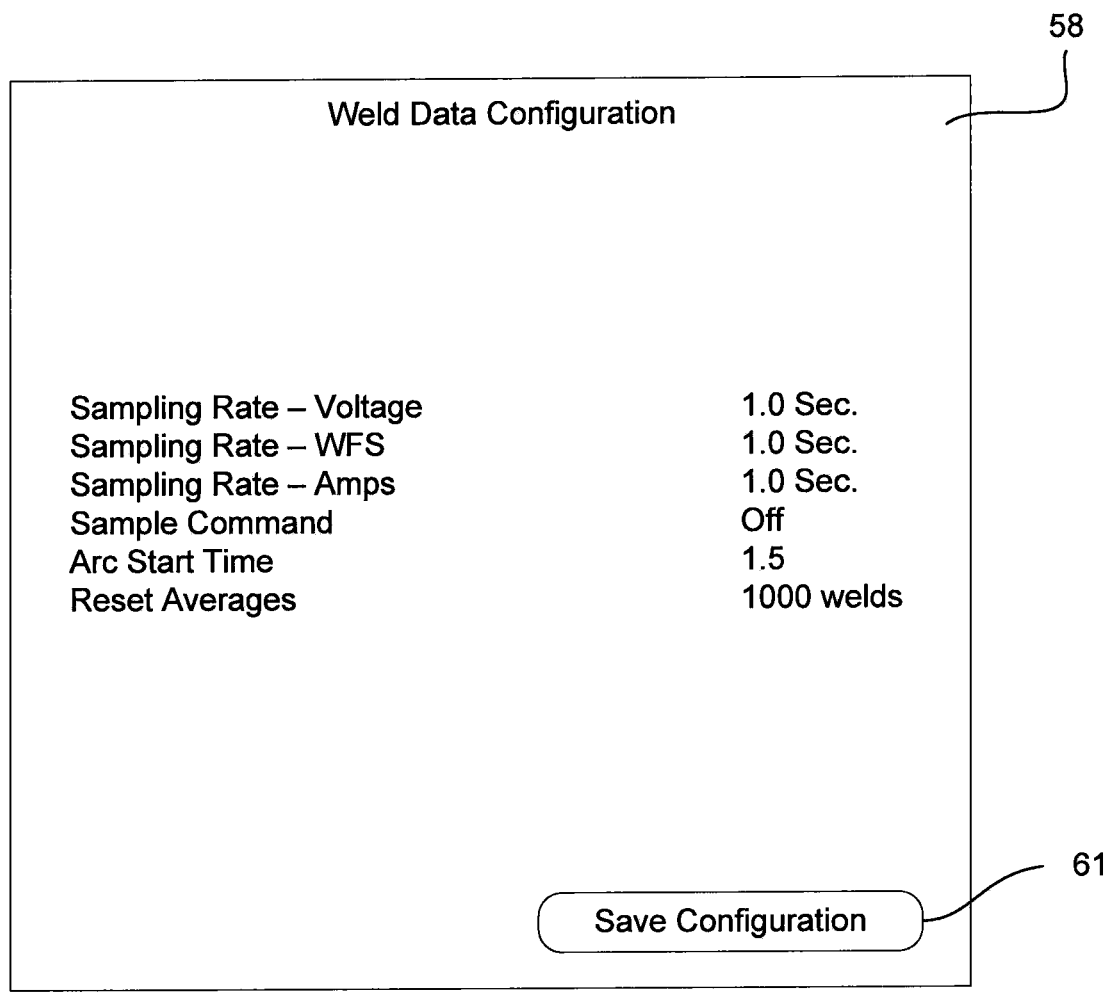
FIG. 8 is a screen shot of a weld data configuration screen for use in the welding system of FIG. 1.
Figure 9:
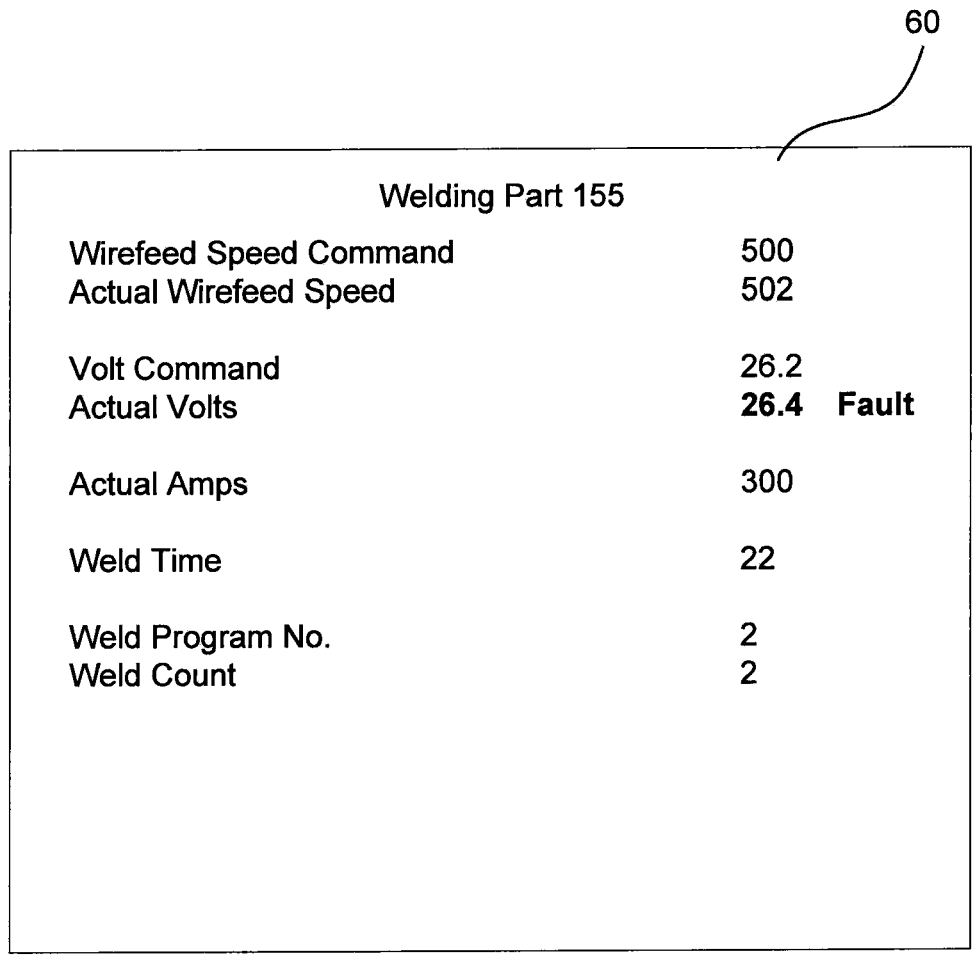
FIG. 9 is a screen shot of a user interface illustrating displaying the results of an on-going weld during arc monitoring.

Referring now to FIG. 2, a main display screen 35 for a weld monitor and training device constructed in accordance with the present invention is shown. The main display can be provided on a user interface 32, from a display interface associated with a PLC 27 or robot 21, or from a computer or other device in communication with the communications system 30. At the main display screen, a user can select between a Weld function (60; FIG. 9), a Weld Edit function, a Weld Program Set-Up function (34, 35; FIGS. 3 and 5), a Part Set-Up function (52; FIG. 6), a Weld Monitor Configuration function (36; FIG. 7), a Weld Data Configuration function (58; FIG. 8), and a Weld Data Access function (88; FIG. 12). Together, these selected functions allow a user to weld a specific part or program; to establish a "good" or "gold standard" program for monitoring the weld on a part; to edit existing stored programs; to establish a sequence of welds for welding a part or job; to configure selected monitoring functions; to establish statistical analysis parameters for a weld; and to review specific weld parameters and fault data for a given weld. Although a series of display screens are shown here, it will be apparent that these displays are by way of example only, and that the functions described and data display could be provided in any number of ways.

Figure 4:
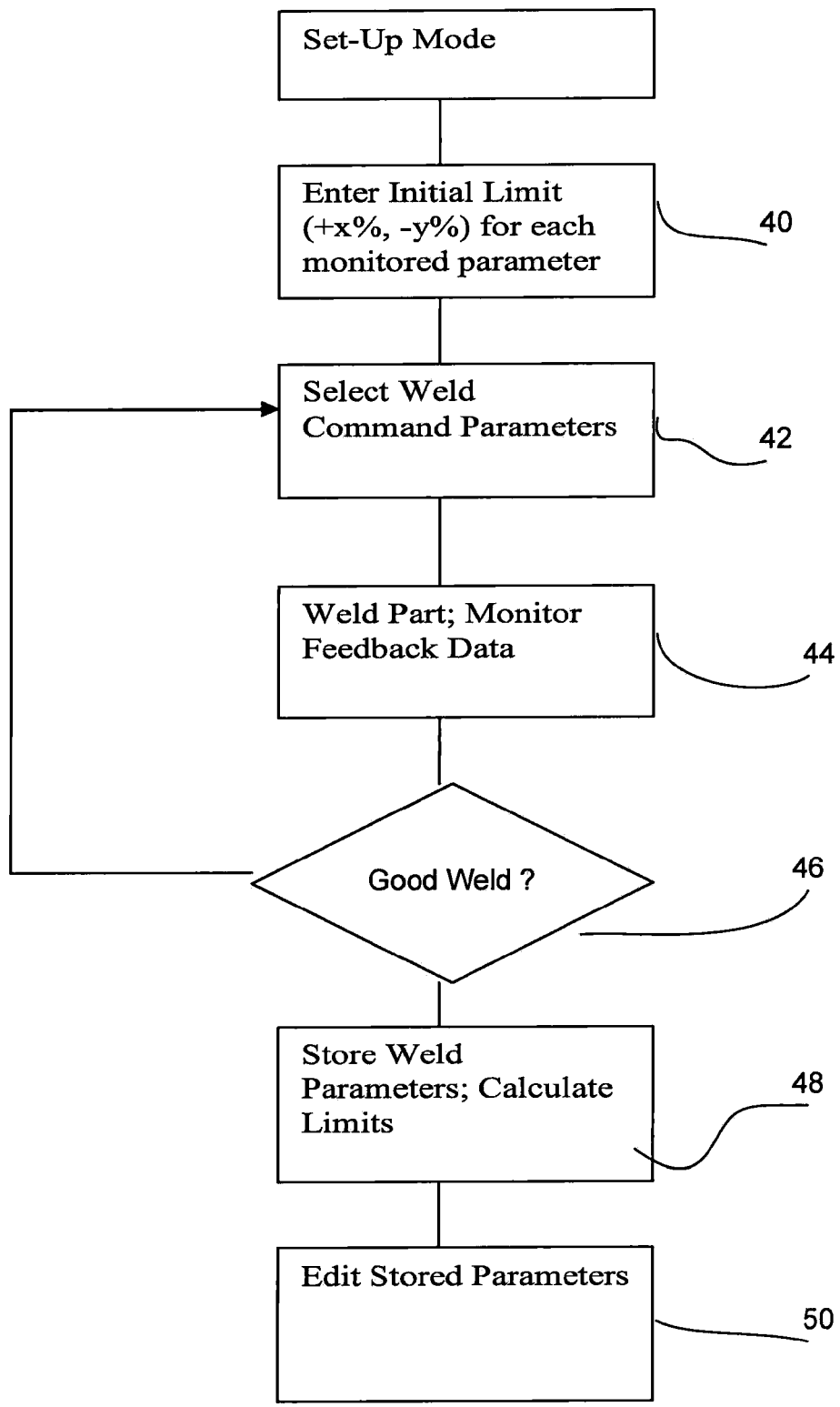
FIG. 4 is a flow chart illustrating operation of the welding system of FIG. 1 in a set-up mode.

Referring now to FIGS. 3-5, display screens and a flow chart are shown to illustrate the Weld Set-Up function, in which the welding system 10 is used to establish a welding procedure based on a known good or "gold standard" weld. Referring first to FIG. 3, on entry to the Weld Program Set-Up function, a display 34 is provided through which a user can name a weld program, using either numerical indicators, as shown here, or alphanumeric characters. The user can then select to use internal signals, e.g. establishment of the command welding parameters from memory 18 or from a display 32 or other component associated with the welding system 10, or to receive welding commands from an external source such as a PLC 27 or robot 21, human machine interface, external controller, teach pendant, or other component through the communications system 30 (FIG. 1). As shown here, the established program is a GMAW (MIG) welding program, and the identified commands are voltage, wire feed speed, and optionally, an inductance command. Other parameters, such as an adjustable arc delay time, which allows a user to select a maximum time period for an arc to start as determined based on current feedback, voltage feedback or both, can also be established. Monitoring alarm limits, either as a max and min value or a percentage value of both the actual feedback and command weld parameters, including voltage, wire feed speed, current, and inductance can optionally be established prior to the weld set-up. Although a GMAW weld set-up is shown and described, it will be apparent that the present invention is not limited to weld systems of this type, and could also be used with other types of welds, including, for example, pulsed MIG, and that the appropriate commands and feedback would vary depending on the type of weld performed.

Referring now to FIG. 4, after the weld parameters are established, the user can weld a part to establish a "gold standard weld", as provided in the flow chart shown here. Initially, in process block 40, an operator optionally sets limits for all of the weld parameters or individual limits for selected weld parameters, which, as discussed above, can include command levels for the welding power system, including a voltage command, a wire feed speed command, and a trim command, and can also include feedback parameters, including an actual voltage, an actual wire feed speed, an actual weld time, an actual weld current, or other parameters. The limits can be specified in terms of units, as, for example, in terms of volts, amps or inches per minute, but are preferably, as shown in FIG. 4, established as a percentage value for each selected parameter. Each of these limits, moreover, can be established individually for each selected weld parameter, and can be varied from weld program to weld program, to provide a customized program for each weld that is tailored specifically to an application. Alternatively, as discussed below, limits can be associated with an individual operator for training or other purposes.

After the limits are established as described above, in process block 42 the operator selects wire feed, voltage, and, optionally, inductance or trim command values, and performs one or more welds (process block 44) at varying selected weld parameters. During the set-up process, the controller 16 monitors the wire feed, voltage, and current feedback from sensors 24, 26, and 28, respectively, and, based on this feedback, samples and stores actual voltage, current, and wire feed speed data acquired during the weld in the memory 18, along with the overall weld time between the establishment of an arc, and the end of the arc. If the user is providing the commands from an external source, such as a PLC 27 or robot 21, the command wire feed, voltage and inductance values are also stored, and in the case of analog input values, can also be sampled at a selected rate.

Referring now also to FIG. 5, after the weld is complete, a display screen 36 displays the weld command values and actual weld parameters. The operator can change the command welding parameters, as shown by icon 38, and perform an additional weld. Alternatively, when the operator is satisfied with a weld, in process block 46, the operator provides a signal to the controller 16 through either the user interface 32 or from an external device through communications system 30, indicating that the parameters from the selected weld are to be stored as the designated weld program. As shown here in FIG. 5, for example, a "store weld program" icon 37 or other selectable option can be provided on the display screen. In response to the signal from the operator, the controller 16 stores the selected voltage and wire feed speed command values, along with the average actual wire feed speed, voltage, and current values of the weld, and the overall arc time (process block 48). If limits have been selected, the controller 16 can then calculate the upper and lower limits for each weld parameter stored based on the selected limits for each of these parameters. The saved program can be stored in memory 18 and/or at an external device with the identifying name or number for later retrieval. The upper and lower limits can be stored with the average values, as shown, or re-calculated whenever a program is selected for operation. Alternatively, as discussed below, the command and feedback values for the weld can be stored without limits, and upper and lower limits can be established and associated with a particular operator, with a particular weld, or with a sequence of welds defining a part or job.

Referring again to FIG. 2, after the weld program is stored in memory, the operator can optionally access the saved program through a display or other methods, using either the user interface 32 or through an external device, retrieve the program data and edit the individual weld parameters and limits. Referring now also to FIG. 6, the user can also specify a series of sequential welds to be used in welding a specific part or job, by selecting the Part Set-Up function 52. As shown here, a series of weld programs can be specified in an order, and a weld count provided to indicate the number of individual welds that are expected to weld a selected part or job. Based on the weld count, arc starts and/or ends can be monitored to verify that all of the welds in a sequence have been completed. A numeric or alphanumeric name, and a selected arc start time can also be associated with the individual part. These parameters can then be stored in memory by activating, for example, the save part icon 54. Alternatively, a series of welds could be welded as described above, and an order specified during the set-up procedure. For example, a user could specify a number of welds for a part, and sequentially save the welds until a part is specified.

Referring now to FIG. 7, from a Weld Monitor Configuration screen 56, the operator or a supervisor can also selectively activate a program or part to be welded, and monitoring functions, including an arc monitoring function that compares the weld parameters against the limit values, and a weld count function. The operator can also set and enable limits, and enable and define fault signals. Additionally, for tracking or monitoring purposes, a specific operator can be identified, and individual monitoring limits can be defined for the operator. As shown here, for example, the name of the operator can be stored at the beginning of a shift, for example. Additionally, the min and max limits for both actual and command weld parameters can be specified to provide the alarm limits that will be activated during any selected weld. These individual limits can also be selectively enabled and disabled. Optionally, the operator or supervisor can also specify the type of fault indicator, either as a single indicator for all of the weld parameters, as shown here, or individually for each specific weld parameter. For example, when an alarm condition occurs, the operator can elect to provide a visual or audible display to the operator or to supervisory personnel. An alarm limit could also be used to shut down the welding system, prompting the operator to start over with a new part, or to send a notification to a supervisor, through, for example, a pager system, email, cellular telephone, or other communication methods accessed, for example, through the communications system 30. The option to select a timed weld, in which the user specifies an overall time for the weld process, an amount of weld material or weld wire to be deposited, can also be provided.

In addition, the Weld Monitor Configuration screen 56 allows the user to activate "programmed commands". When "programmed commands" is activated, the controller 16 controls the weld parameter commands, preventing the operator from supplying external commands or otherwise modifying the input commands. This function, for example, is useful when an operator is inexperienced, and can also be used as a training tool, allowing an operator to view the weld as controlled by the power supply. After the operator is comfortable with the weld, the programmed commands can be deactivated, and the operator allowed to provide a weld command signal that is monitored within selected arc monitoring limits. These limits, moreover, can be varied depending on the experience level of the user. Referring again to FIG. 7, a "restore commands" function can also be provided. When this function is activated, the weld command parameters for a specific weld program or part can be restored to their initial stored values, either at the power supply 12, or through transmission to an external device through communication system 30. This function is useful, for example, to restore command values after a power failure, or after parameters have been edited out of range, to reinstate the known good values. After the configuration is established through screen 56, a user can store the data to memory by activating icon 59.

Referring now to FIG. 8, a Weld Data Configuration screen 58 can also be provided to allow a user to select sampling rates for data acquisition for the voltage, wire feed speed, and current feedback. Sampling rates can also be associated with weld command values, such as analog command signals received from an external source such as a robot 21. Additionally, the user can select a number of welds, or alternatively, a time frame for calculating averages for each of these parameters. Again, these selected analysis parameters can be saved by activating icon 61.

Figure 10:
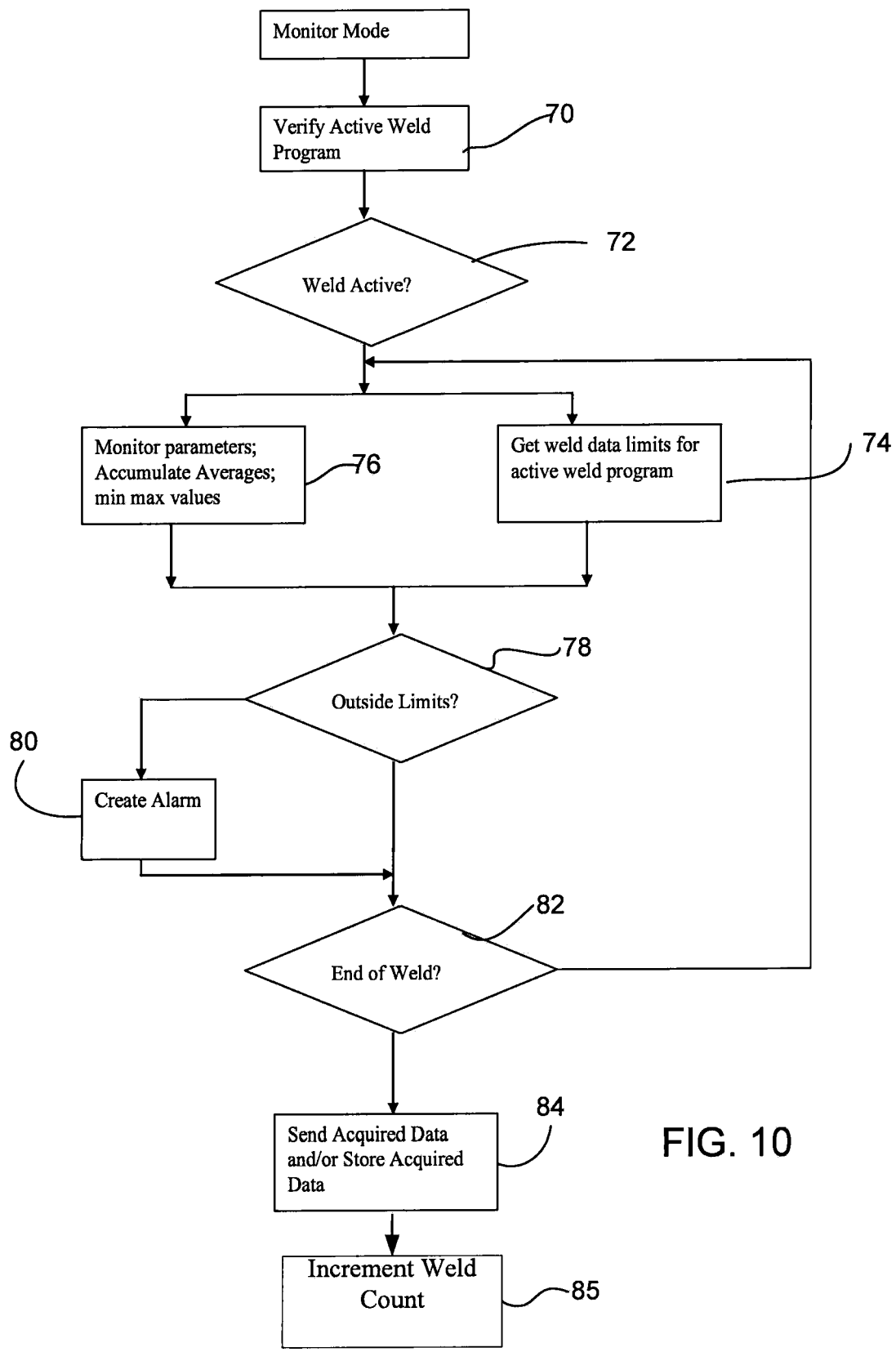
FIG. 10 is a flow chart illustrating the arc monitoring mode of operation of the weld system of FIG. 1.

Referring now to FIGS. 9 and 10, a weld display screen 60 that displays weld data during the weld while arc monitoring is enabled is shown along with a flow chart illustrating use of the arc monitoring system. When the arc monitor is enabled, in operation, the controller 16 monitors the active weld program or part (process block 50) and monitors either current feedback from the sensor 28 or a combination of current and voltage feedback from sensor 26 to determine whether an arc start has been achieved, and a weld has been started (process block 52). Once an arc is established, the controller 16 stores a date and time stamp in memory 18, retrieves the weld parameter limits and alarm enable/disable data for the selected program from memory 18 (process block 54), and monitors the welding parameters, accumulating averages and minimum and maximum values for the actual weld voltage, weld current, and wire feed speed, and accumulating weld time (process block 56). Optionally, the controller 16 can also calculate a run-in time as a function of the time between the start of the wire feed motor, and the arc start time. After arc start, the controller monitors each of the parameters to determine whether they fall outside of the established limits (process block 58) and, if a parameter falls outside of the established limits, and the alarm for that parameter is enabled, the controller 16 creates an alarm (process block 60). The alarm, for example, can be provided by highlighting a weld parameter that has exceeded the limit on a weld display, as shown by the error in bold in FIG. 9, or through an external device connected to the welding system, such as a light or buzzer. The controller 16 continues to monitor data until the weld ends (process block 62). When the weld count function is activated, the processor 16 can also increment a weld counter (process block 64). The weld data, approximate time and location of an alarm condition, and associated weld number or count, can all be stored in memory 18 and/or communicated to an external device through communication system 30.

Referring still to FIG. 10, and now also to FIGS. 1 and 11, at the end of the weld, the controller 16 calculates the overall weld time, average actual wire feed speed, average actual weld voltage, and average actual weld current values, and displays these values on Weld screen 86. Based on this data, the controller 16 can also calculate the amount of wire used during the weld, as a function of the wire feed speed and overall time of the weld (process block 64). Other process parameters, including gas usage, could also be calculated. This acquired data, along with any alarm limits encountered during the weld, can be written to a display, as shown in FIG. 11, forwarded to a remote device through the communications system 30, stored in local memory 18, or any combination of these options (process block 66). Additionally, using weld time data, proximity sensor data, weld count data, and optionally, travel speed data from a robot or PLC, an approximate location of the alarm condition can be determined and stored in memory 18 or communicated through communication system 30.

Referring now to FIGS. 2 and 12, stored weld data can be accessed by a user by selecting the Access Weld Data function from the main menu (FIG. 2.), which leads to the Weld Data Screen 88 of FIG. 12. Here, data related to the welds performed on the welding system 10 are stored along with part or weld name, operator name, a date, and a time stamp. By selecting an individual weld in the database of FIG. 12 using icon 89, the user can access the Weld Detail data of FIG. 13. As shown here, weld identification and time stamp data is stored here with corresponding weld times, weld counts, average actual and command data for each of the parameters of the specific weld, and an average for the selected weld over a selectable number of welds. A listing of the faults that occurred during the weld is also provided, and optionally, other weld data, such as average or instantaneous motor power or current data, motor voltage data, number of short circuits in a weld, etc. Additionally, consumable data, such as wire usage and gas usage, can be determined and displayed. Acquired data can also be used to predict consumable life end. For example, motor current, voltage, and power parameters, and particularly changes in motor parameters, can be used to evaluate wear on contact tips in the wire feed system 20, as well as wear in the liners and drive rolls in the wire feed system. Changes in voltage feedback can also be monitored and used to evaluate and troubleshoot problems in secondary grounding and cables.

Although not shown here, as discussed above, to provide sufficient data to identify weld faults in specific parts and to troubleshoot problems with the weld and equipment, location of the weld fault can be determined, for example, from fixture clamp and sensor data, travel speed, and other identifying data. Alternatively, or in addition to the database shown, a stream of data including weld data, weld time, proximity sensor data indicating, for example, the last sensor tripped and other weld, time and location sensor data can be communicated through the communications system 30 to an external device such as a PLC 27, a networked computer, or other data storage device.

The present invention therefore provides a highly flexible system that provides a number of significant improvements over prior art arc monitoring systems. First, the arc monitoring system is provided within the welding power source, and uses the internal sensing components of the power source, thereby limiting the need for external sensors and external cabling, and reducing the footprint of the welding equipment in the weld cell. The system, therefore, is significantly easier to connect in a welding cell than prior art systems.

Additionally, because the arc monitoring system of the present invention receives weld command data, including, for example, voltage, wire feed speed, and inductance command input from an operator to drive the power source, command input levels can be monitored in addition to feedback levels. As a result, the commands provided by an operator, whether from a handheld system, robot, or PLC, can be monitored, and an alarm signal generated when the command levels are out of an expected or acceptable range.

The command level limits and fault data, moreover, can be used for improving training of the operator, and also in troubleshooting external equipment, and restoring commands to a useable level. As a training tool, for example, the power supply could initially be set to control the weld using a stored weld program, and the operator could observe the weld in process while welding. After observing the weld a number of times, the operator can be allowed to control the weld within defined limits, as described above. The arc monitor can either monitor the command signals, the actual feedback signals, or both. Alarm signals can be generated when either the command values or the actual feedback values extend outside of a selected range of values. As the operator improves, the limits can be extended, and additional autonomy for correcting weld problems can be given to the operator.

Additionally, because the command values for a predetermined "good weld" are stored in the memory 18 of the weld system 10, the command levels can be recalled and either controlled directly by the weld system 10 or sent to an external device to restore an acceptable command level. This function, for example, is useful when the commands provided by an external device are out of range, either due to an operator error, or to a power or other system failure, and is particularly important in restoring usable welding conditions during automated welding processes, which could otherwise result in significant down time or material loss.

Additionally, because both weld command and feedback values can be monitored and stored, the relationship between the command and resultant feedback data can be analyzed to determine appropriate changes to the weld process due to changes in environmental conditions, time of operation, and other factors. The data can also be used to train and evaluate operators, as discussed above, for evaluating consumable usage, and for troubleshooting the system when weld problems occur.

Although a number of user-accessible screens are described above, it will be apparent that access to the various functions described can be limited through the use of password protection, RFID tokens, digital or mechanical key systems, or other means. For example, one level of security may be provided to allow access to the weld monitor configuration, while a second level of security could be used to provide access to the weld acquisition data. Access to weld set-up and weld editing functions might also be limited, for example, to specific supervisory personnel. Various levels of security could be provided to vary access to individual screens or to individual data on the various screens.

It should be understood that the methods and apparatuses described above are only exemplary and do not limit the scope of the invention, and that various modifications could be made by those skilled in the art that would fall under the scope of the invention. For example, although a part set-up system is described in which segments of a weld are defined as individual programs, and a sequence of welds is defined to provide a part or job, it will be apparent that a part or job could be welded and stored as described above with reference to the weld set-up. Here, individual segments of a weld could be defined by proximity sensors or clamp sensing, by input from an operator through an interface, or in various other ways.

Furthermore, while a specific set of screens is described above, it will be apparent that the functions described could be implemented in a number of different ways. Additionally, although specific data types are described with reference to each of the screens described above, it will be apparent that the data could be configured in any number of ways.

To apprise the public of the scope of this invention, the following claims are made:

What is claimed is:

1. A welding system including an arc monitor for monitoring the quality of the weld against predetermined weld parameters and limits, the welding system comprising: a power supply for providing welding power to a weld; a weld parameter feedback sensor for monitoring at least one of a current feedback and a voltage feedback signal from the weld; a memory adapted to store a programmed weld in a memory structure; and a controller programmed to: sample a weld command parameter and a weld feedback parameter during a weld and to store the weld command parameter and weld feedback parameter as a programmed weld in the memory; associate arc monitoring data including a user-supplied limit corresponding to an acceptable range of welding command parameters and a user-supplied limit corresponding to an acceptable range of weld feedback parameters with the programmed weld; selectively switch control of the power supply between a programmed weld mode where programmed commands are active and the welding command parameter is retrieved from the stored programmed weld and a monitor mode where programmed commands are inactive and an external welding command is received from a user for driving the power supply to a selected voltage level; and in the monitor mode, to compare the external welding command to the corresponding weld command limit and to compare the actual weld feedback parameter from the weld feedback sensor to the corresponding weld feedback limit, and to store an identified fault in memory when the external welding command or the weld feedback exceeds the corresponding limit.

2. The welding system of claim 1, wherein the controller is further programmed to monitor the weld feedback sensor, compare the weld feedback to the programmed weld feedback, and to activate an alarm condition when at least one of the monitored weld feedback and the monitored weld command exceeds the limits, and wherein the step of activating the alarm condition comprises at least one of activating a fault signal when the selected limit is exceeded and storing the fault in memory.

3. The welding system of claim 1, wherein the controller is further programmed to calculate the limits as a function of the stored welding command and welding feedback.

4. The welding system of claim 1, wherein the controller is further programmed to store a sequence of programmed welds as a programmed part, and to provide access to a user to selectively retrieve the programmed part and to provide a command to weld the part.

5. The welding system of claim 1, further comprising a communications system providing communications between the controller and an external device, and wherein the external device comprises at least one of a robot, a programmable logic controller, and a computer, and wherein the external device provides the external welding commands.

6. The welding system of claim 1, wherein the controller is further programmed to associate an operator-supplied time with the programmed a weld.

7. The welding system of claim 1, wherein the controller is further programmed to allow an operator to designate a plurality of sequential welds to designate a programmed part.

8. The welding system of claim 1, wherein the controller is further programmed to store a time stamp in memory when the weld command exceeds a limit.

9. The welding system of claim 2, wherein the controller is further programmed to associate a selected user with the limit, wherein the user can be correlated with the fault conditions.

10. A method for monitoring a quality level of a weld procedure in a welding system comprising a controller and a memory component, the method comprising:

performing a weld of an acceptable quality and storing a weld command parameter and a weld feedback parameter corresponding to the weld in a programmed weld in the memory component;

associating a fault limit with the weld command parameter and the weld feedback parameter in the memory component;

switching between a programmed weld mode, where the weld command parameter from the programmed weld is used to control the welding system, and a monitor weld mode where an external weld command parameter provided by a user is used to control the welding system;

monitoring the external weld command parameter supplied by the user and a corresponding weld feedback parameter during a subsequent weld;

comparing the weld command parameter supplied by the user and the corresponding weld feedback parameter to the fault limits during the weld; and providing a fault alarm signal when the weld command parameter exceeds the fault limit, the fault signal indicating the weld is outside of a predetermined quality parameter.

11. The method as recited in claim 10, wherein the weld command parameter comprises at least one of a voltage command, a wire feed speed command, and an inductance command.

12. The method as recited in claim 10, wherein the weld feedback parameter comprises at least one of a voltage feedback, a current feedback, a wire feed speed feedback, and a weld time feedback.

13. The method as recited in claim 10, further comprising the step of associating a predetermined user with the fault limit, and selectively activating the fault limit when the identified user is supplying the external command, wherein the quality of welds provided by a selected user is monitored.

14. The method as recited in claim 10, further comprising the steps of performing a second weld of an acceptable quality and storing a weld command parameter and a weld feedback parameter corresponding to the second weld, and storing the weld command and the second weld command in the memory component as sequential welds in a part.

15. The method as recited in claim 10, further comprising the step of storing a user-selected weld time, and wherein the step of monitoring a corresponding weld command parameter and a corresponding weld feedback parameter during a subsequent weld further comprises monitoring the user-selected weld time, and ending the subsequent weld when the weld time is exceeded.

16. The method as recited in claim 10, further comprising the step of storing the weld feedback parameters during the weld.

17. The method as recited in claim 10, further comprising the step of incrementing a weld count when each subsequent weld is completed.

18. The method as recited in claim 10, further comprising the step of providing a user-selectable sampling rate for sampling the weld command and the weld feedback parameter.

19. A method for monitoring a quality level of a weld procedure comprising: performing a weld with a welding power source; evaluating whether the weld is of an acceptable quality; storing a weld command parameter and a weld feedback parameter corresponding to the weld as a programmed weld in a memory component of the welding power source when the weld is of an acceptable quality; performing a second weld; determining whether the second weld is of an acceptable quality; storing a weld command parameter and a weld feedback parameter corresponding to the second weld as a second programmed weld when the weld is of an acceptable quality; selectively linking the programmed weld and the second programmed weld in a sequential order as a part program in the memory component of the welding power source; and retrieving the part program to perform a weld; selectively switching between a programmed weld mode where the part program is retrieved from the memory and the stored weld command in the programmed weld and the second programmed weld are used to control the welding power source, and a monitor mode where an external command weld parameter is received from an external source and is used to control the welding power source; and during the monitor weld mode, comparing the received weld command parameter from the user-supplied external source to a limit stored in the memory component of the welding power source and selectively storing a fault in memory when the weld command exceeds the limit, and comparing weld feedback from the sensor to the limit stored in the memory component of the welding power source and selectively storing a fault in memory when the weld feedback exceeds the limit, the fault indicating that the weld is outside a predetermined quality parameter.

20. The method as recited in claim 19, further comprising the step of providing an upper and a lower limit for the weld command parameter, and for selectively allowing an external weld command parameter, wherein the weld command parameter is compared to upper and the lower limits, and an alarm is generated when the external weld command parameter exceeds at least one of the upper and the lower limits.

21. The method of claim 19, further comprising the step of storing a time stamp in the memory component of the welding power source corresponding to each of the weld program and to the second weld program.

22. The method of claim 19, wherein the external weld command parameter is transmitted from at least one of a robot and a programmable logic controller.

* * * * *

UNITED STATES PATENT AND TRADEMARK OFFICE
CERTIFICATE OF CORRECTION

| | |
|---|---|
| PATENT NO. | : 9,442,481 B2 |
| APPLICATION NO. | : 12/350301 |
| DATED | : September 13, 2016 |
| INVENTOR(S) | : Robert Raimund Davidson et al. |

It is certified that error appears in the above-identified patent and that said Letters Patent is hereby corrected as shown below:

On the Title Page

Item (75), the second inventor:
"Joseph Kyle Flnk" should be --Joseph Kyle Fink--

Signed and Sealed this
Third Day of January, 2017

Michelle K. Lee
*Director of the United States Patent and Trademark Office*